Sept. 22, 1931.  T. H. THOMAS ET AL  1,824,060
VALVE MECHANISM FOR AUTOMATIC TRAIN PIPE COUPLINGS
Filed Dec. 14, 1928  2 Sheets-Sheet 1
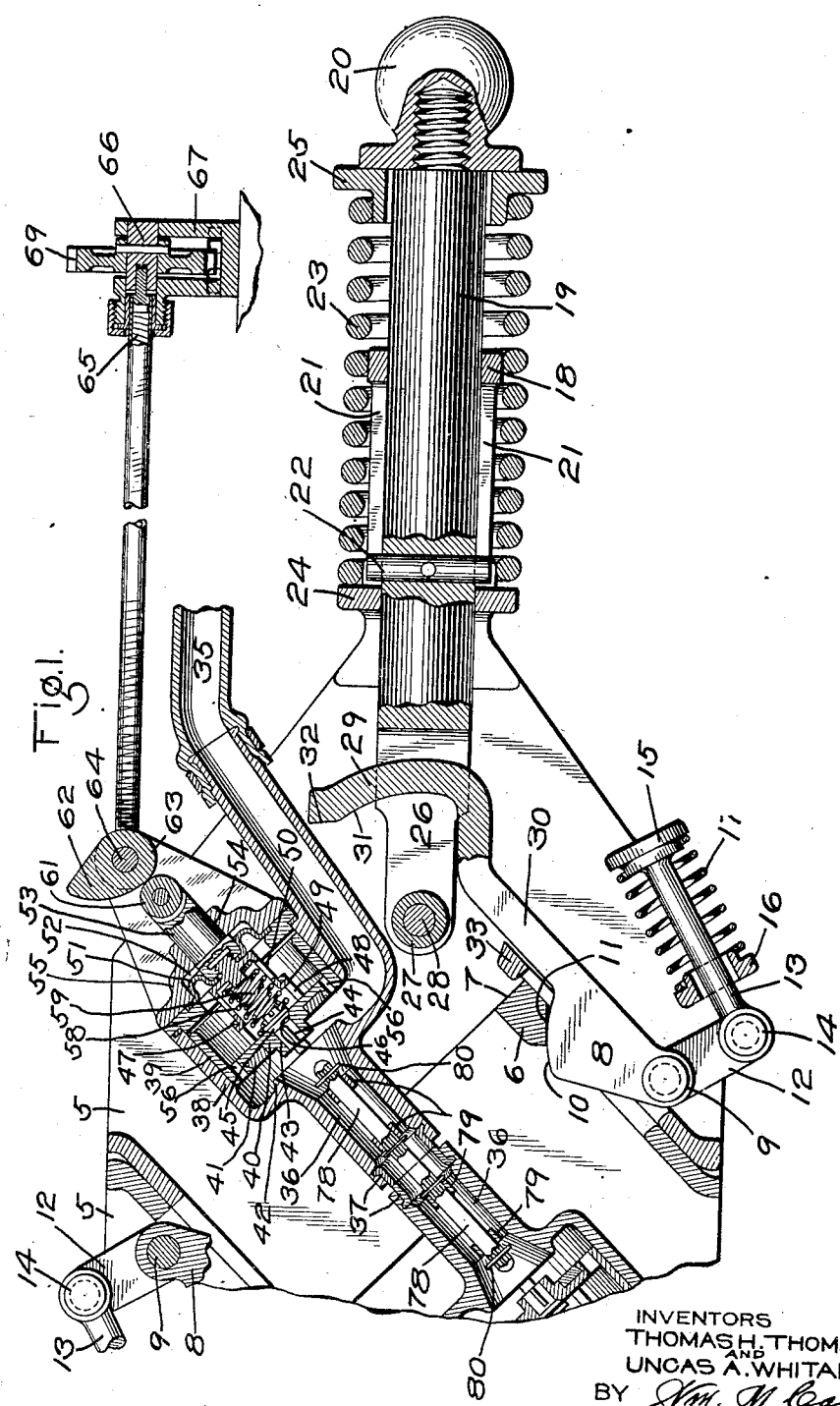
INVENTORS
THOMAS H. THOMAS
AND
UNCAS A. WHITAKER
BY *Wm. M. Cady*
ATTORNEY

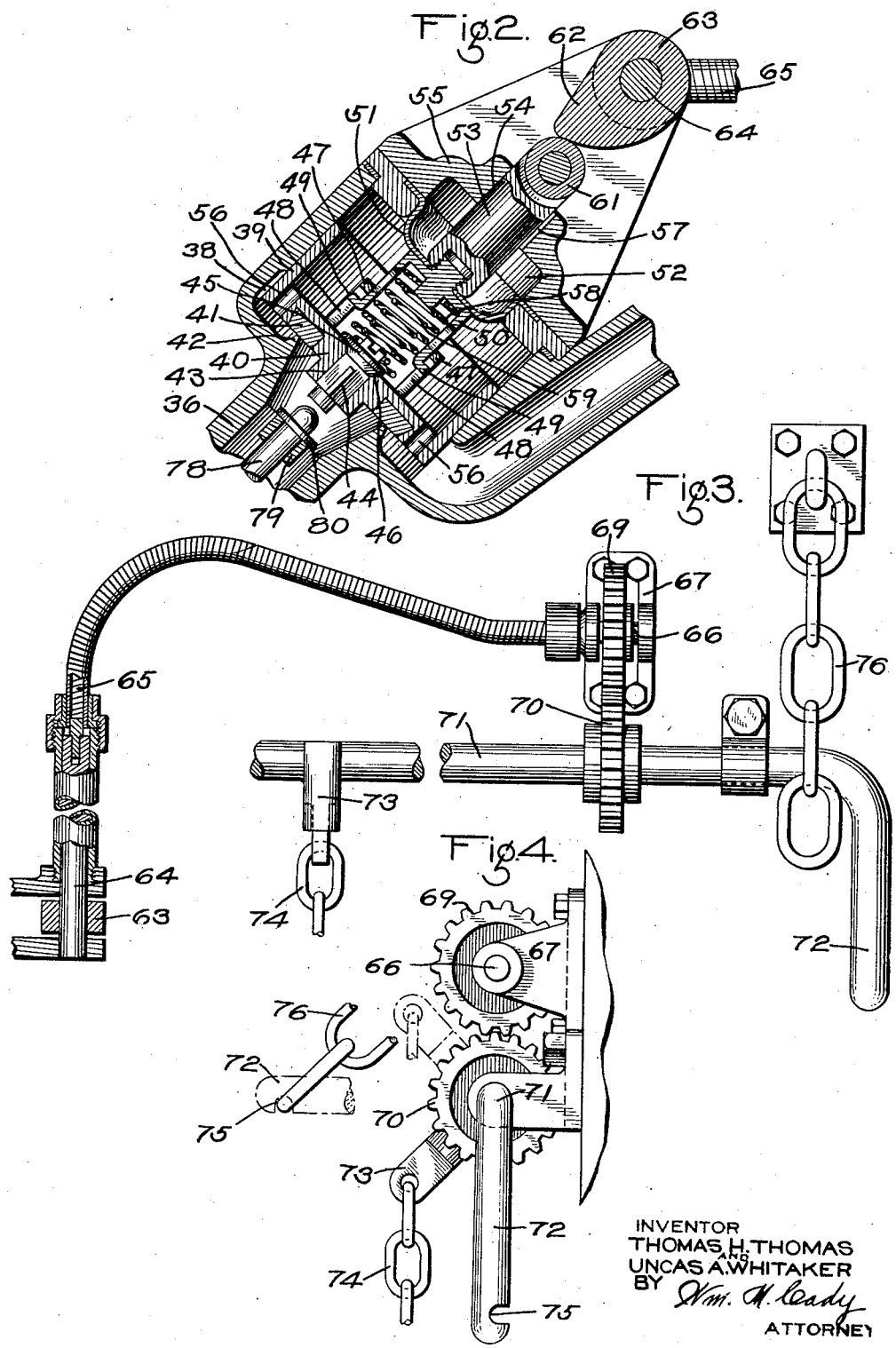

Patented Sept. 22, 1931

1,824,060

UNITED STATES PATENT OFFICE

THOMAS H. THOMAS, OF EDGEWOOD, AND UNCAS A. WHITAKER, OF WILMERDING, PENNSYLVANIA, ASSIGNORS TO THE WESTINGHOUSE AIR BRAKE COMPANY, OF WILMERDING, PENNSYLVANIA, A CORPORATION OF PENNSYLVANIA

VALVE MECHANISM FOR AUTOMATIC TRAIN PIPE COUPLINGS

Application filed December 14, 1928. Serial No. 326,090.

This invention relates to automatic train pipe couplings, and more particularly to the type known as the tight or rigid lock coupling.

An object of the invention is to provide a novel fluid control means for automatic train pipe couplings.

Another object of the invention is to provide an automatic train pipe coupling having fluid control means by which communication through a fluid conduit in the coupling will be prevented when the cars are intentionally separated, and in which the fluid control means will not be actuated to cut off communication through the conduit should the cars be unintentionally separated so that the end of the conduit which has been separated from the corresponding conduit of a counterpart coupling will be open to atmosphere to effect an emergency application of the brakes.

Another object of the invention is to provide a train pipe coupling with means for restricting the communication through a conduit in the coupling head when a section of train having an uncharged brake pipe is being coupled to a section of train having a charged brake pipe, so as not to produce a too rapid drop in the pressure of the fluid in the brake pipe of the charged section.

Another object of the invention is to provide a train pipe coupling in which the communication through a conduit in the coupling head is controlled by means of a poppet valve adapted to be manually actuated to cut off communication through the conduit when the cars are uncoupled and to be automatically unseated by means mounted in the conduit and operated upon the coming together of the coupling with a counterpart coupling, when the cars are being coupled up.

Another object of the invention is to provide a train pipe coupling in which communication through a conduit in the coupling will be automatically restricted when a section of train having a charged train pipe is coupled to an uncharged section, means being included for automatically permitting unrestricted communication through the train pipe when the pressures of the fluid in the two train sections are so nearly the same amount that an emergency application of the brakes on the charged section will not result.

Another object of the invention is to provide an automatic train pipe coupling of the character specified, in which communication through a conduit in the coupling is controlled by means of a compound poppet valve comprising a main valve and an auxiliary valve carried by the main valve and adapted to control communication through a restricted opening in the main valve, the auxiliary valve being actuated to establish communication when the main valve is closed by means located in the mouth of the conduit and engaged by similar means in the counterpart coupling when the two couplings are brought together for coupling up.

Another object of the invention is to provide an improved type of train pipe coupling of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings; Fig. 1 is a longitudinal section of an automatic train pipe coupling embodying the invention showing the same in coupled position; Fig. 2 is an enlarged section of the valve device in closed position; Fig. 3 is a view of the car coupling unlatching mechanism and the means actuated thereby for operating the valve device; and Fig. 4 is an end elevation of a portion of the structure shown in Fig. 3.

Train pipe couplings of the type known as the tight or rigid lock coupling, are shown for example, in the Westinghouse Patent No. 708,747, dated September 9, 1902, and in which each coupling head is provided with a laterally projecting hook-shaped portion adapted to engage the corresponding portion of a counterpart coupling by a relative lateral movement, and be rigidly locked together by cam levers or latches, one pivoted upon each coupling head and bearing against the other counterpart coupling head. Train pipe passages are formed in the coupling heads and are provided with gaskets adapted to abut against corresponding gaskets of the counterpart coupling head when the two are connected together.

While a coupling of the above type will automatically couple with a counterpart coupling when two cars are brought together, it is necessary to manually operate the train pipe valves to charge the empty brake pipe of an uncharged train section from the brake pipe of a charged section.

By the present invention, means are provided for actuating the valve mechanism of an automatic coupling when the car unlatching mechanism is operated, so as to close the valves when the cars are uncoupled, the valve actuating mechanism being operated automatically to open the valves when the coupling is coupled to a counterpart coupling, and being prevented from operating to close the valves should the cars be unintentionally uncoupled. Means are also provided for permitting only a restricted amount of fluid to flow through the brake pipe from a charged section of train into an uncharged section, when a charged section is coupled to an uncharged section, until the pressure of the fluid has been built up a predetermined amount in the brake pipe of the uncharged section, so that an emergency application of the brakes on the charged section will not be caused by a too rapid drop in brake pipe pressure.

Referring to the drawings, the automatic train pipe coupling head 5 comprises a projecting nose 6 adapted to engage in a recess 7 of a counterpart coupling head.

A lever 8, pivoted in the coupling head 5 at 9, has a cam face 10 for engaging the face 11 of a counterpart coupling head, to lock the two coupling heads together when the same are coupled in the manner shown in Fig. 1.

The lever 8 carries an arm 12, to which a rod 13 is pivotally connected by a pin 14. The outer end of the rod 13 is provided with a head 15, and interposed between said head and a fixed abutment 16, is a coil spring 17.

The rear end of the coupling head 11 is formed with a tubular extension 18 which constitutes a guide for the forward end of a stem 19.

The stem 19 has its rear end provided with a ball section 20 adapted to be mounted in a socket (not shown) carried by the car.

The tubular extension 18 is provided with diametrically disposed longitudinal slots 21 into which extend the projecting ends of a pin 22 which is passed transversely through the stem 19.

A coil spring 23 encircles the stem 19 and the tubular extension 18, one end of the spring bearing against a flange 24 formed on the inner end of the coupling head, while the opposite end of the spring bears against a collar 25 at the inner end of the stem.

The spring 23 is normally under initial compression which tends to hold the parts extended. However, when the coupling head is coupled to a counterpart coupling, the spring is compressed, and the forward end of the stem 19 is disposed in the coupling head in the manner shown in Fig. 1, for a purpose to be described.

At the front end, the stem 19 is provided with an extended portion 26, on which a roller 27 is mounted by means of a pin 28. The roller 27 is disposed along the longitudinal center line of the stem and it is adapted to be engaged by the hook-shaped end 29 of an arm 30 extending from the lever 8.

When the coupling head is coupled with a counterpart coupling, the spring 17 will force the cam surface 10 of the lever 8 tightly into engagement with the surface 11 of the counterpart coupling and the end 29 of the arm 30 will be disengaged from the roller 27. However, when the cars are uncoupled and the couplings separate, the spring 23 will force the coupling head outwardly on the stem 19, thereby bringing the cam surface 31 on the end 29 of the arm 30 into contact with the roller 27.

The extremity of the arm 30 is formed with an arcuate recess 32 into which the roller 27 seats when the coupling head 5 is moved outwardly with respect to the stem when the coupling is being uncoupled. In this way the lever 8 will be retained in its innermost position within the coupling head and it will be disposed out of the path of the nose 6 of a counterpart coupling head.

For the purpose of limiting the outward movement of the lever 8, the coupling head is provided with a lug 33 against which the arm 30 may strike in case the interlock provided when the roller 27 is positioned in the recess 32 should become detached when the coupling head is uncoupled.

The coupling head is provided with one or more conduits. In the present instance it is shown as having a conduit 36, the rear end of which is connected to the brake pipe 35.

The forward or nose end of the conduit 36 is provided with a gasket 37 adapted to abut the corresponding gasket on the other coupling and make a fluid tight joint between the conduits when the coupling heads are coupled together.

For the purpose of controlling communication through the conduit 36, a compound poppet valve device is mounted in a chamber 38 formed in the coupling head 5 and communicating with the conduit 36.

The compound poppet valve device includes a valve piston 39 having a head 40 provided with a gasket 41 for engaging with a seat rib 42 when the coupling head is uncoupled, so as to cut off communication through the open end of the conduit 36.

Within the gasket 41, the head of the valve piston is pierced to provide an opening 43 for the fluted stem 44 of an auxiliary valve 45. The head of this valve is adapted to engage a seat 46 formed around the opening 43, and surrounding the head of the valve 45 is a tubular collar 47 which is carried by the head 40 of the valve piston 39.

The side wall of the collar 47 is formed with a plurality of slots 48, into which are disposed the out turned fingers 49 projecting from the edge of the skirt of a cap 50 mounted on one side of a diaphragm 51.

The side of the diaphragm 51 opposite to the side having the cap 50 carries a stem 53 which is slidably mounted in an opening 54 formed in the end wall of the valve casing 55.

The diaphragm 51, on the side having the cap 50 is subject to the pressure of the fluid which is admitted to chamber 38 through a plurality of openings 56 formed in the head 40 of the valve piston 39, while on the other side the diaphragm is subject to atmospheric pressure in a chamber 52 which is admitted through a groove 57 formed in the opening 54.

Contained within the collar 47 and cap 50 is a pair of expansible coil springs 58 and 59, the former bearing at one end against the head of the valve piston 39, while the latter spring, which is disposed within spring 58, bears at one end against the head of valve 45. At their opposite ends, both springs bear against the head of the cap 50 and thus tend to retain the valve piston 39 extended relative to the diaphragm 51, the outward movement of the valve piston relative to the diaphragm being limited when the fingers 49 engage the ends of the slots 48, as shown in Fig. 1.

The extremity of the stem 53 is provided with a roller 61 against which rides the face of a cam 62 of an actuator 63 mounted on a shaft 64 journalled in the coupling head.

The shaft 64 is operated by a flexible drive shaft 65, one end of which is connected to the end of the shaft 64, while the opposite end thereof is connected to the end of a shaft 66 journalled in a bracket 67 mounted on the end of the car.

The shaft 66 is preferably disposed at a point contiguous to the mechanism used for releasing the car coupling locking pin in the car coupler, and this shaft carries a gear 69 which meshes with a gear 70 on the rod 71 of the said mechanism.

At one end, the rod 71 is bent downwardly to provide a lever 72, while intermediate of the rod, there is a laterally projecting arm 73, to the extremity of which a chain or other flexible element 74 is attached for lifting the car coupling latching pin (not shown) when the lever 72 is actuated, as will be hereinafter described.

Near its extremity, the lever 72 is provided with a notch or groove 75 for receiving a link of a chain or other flexible element 76 suspended from the car, when the lever is in a raised position, so as to lock the lever to prevent rotation of the gears 69 and 70, drive shaft 65, and actuator 63, when the car is uncoupled.

Within the forward portion of the conduit 36 there is an elongated plunger 78 which is slidably mounted in spaced bearings 79. The opposite ends of the plunger beyond the bearings are provided with collars 80. These collars are spaced apart a distance greater than the distance between the bearings 79 so as to permit limited longitudinal movement of the plunger. For this purpose the relative positions of the collars with respect to the bearings should be such that when the coupling head is uncoupled, one end of the plunger will project beyond the gasket 37 an amount sufficient to be engaged by the end of the plunger on the counterpart coupling and be moved thereby inwardly of the conduit 36.

In operation, when the cars of a train having a charged brake pipe are to be separated, the car coupler at the end of the section which it is desired the brake pipe should remain charged is manipulated by swinging the lever 72 from the full line position shown in Fig. 4 to the broken line position shown. The lever 72 is locked in position by slipping a link of the chain 76 over its end and into engagement with the notch 75.

The upward movement of the lever 72 will be transmitted through the gears 70 and 69 to the shaft 65, and the cam 62 will be rotated in a direction to depress the stem 53, which will in turn move the diaphragm 51 downwardly.

The downward movement of the diaphragm 51 will be transmitted through springs 58 and 59 respectively to the head of the valve piston 39 and the head of valve 45. The valve device will now be forced toward the seat rib 42 thereby shutting off communication through the conduit 36.

After the valve piston has been seated against the seat rib 42, continued movement of the diaphragm 51 will telescope the collar 47 and the cap 50 together, the fingers 49 of the cap moving down the slots 48 in the collar 47 so that the valve piston will be held firmly seated by the force exerted by spring 58 plus the pressure of the fluid in chamber 38 which is admitted through the openings 56 in the head 40 of the valve piston.

When the train pipe coupling heads are coupled together, the adjoining ends of the plungers 78 will abut, and hence the end of the plunger will be struck by the tip of the stem 44 when the valve piston is moved against the seat rib 42 and the plungers will be shifted longitudinally of the conduit 36, thereby permitting valve 45 to remain seated.

After the car coupling pin has been lifted by swinging the lever upwardly in the manner heretofore described, and as the cars separate, the interlocked train pipe coupling heads 5 will remain coupled and locked together until the cars have moved apart sufficiently to pull the coupling heads outwardly of the stem 19 until further longitudinal movement is prevented by the pins 22 engaging the ends of the slots 21.

This action will move the end 29 of the arm 30 toward the extremity of the portion 26 of the stem 19. When the cam surface 31 engages the roller 27, the arm 30 will be caused to move laterally of the stem until the roller 27 engages in the recess 32. The cam surface 10 of the lever 8 will now be withdrawn from the face 11 of the counterpart coupling head. In this way the interlocked coupling heads will be automatically unlatched.

On the other hand, in coupling a section of train having an empty brake pipe to a section having a charged brake pipe, when the cars are brought together for coupling up, the impact of the two coupling heads coming together will move the coupling head 5 rearwardly on the stem 19 and this action will detach the roller 27 from its engagement with the recess 32 of the arm 30.

When the projecting nose 6 of one train pipe coupling head enters the recess 7 of the counterpart coupling head, the gaskets 37 will meet and the adjacent conduits 36 will be connected together.

The pressure of spring 17 will force the lever 8 outwardly toward the nose 6 of the counterpart coupling head so that the cam face 10 engages the face 11 and locks the two coupling heads tightly together in the manner shown in Fig. 1.

When the coupling heads 5 come together for coupling up, the projecting ends of the plungers 78 will also be brought together and each plunger will be moved inwardly of the conduit 36 and abut the end of the corresponding valve stem 44, thereby forcing the valve 45 inwardly away from its seat 46.

The valve 45 of the two coupling heads will thus be unseated when the gaskets 37 meet and the adjoining ends of the conduits 36 are connected, thereby establishing communication between the section of train having the charged brake pipe and the section having the uncharged brake pipe.

In view of the restricted passage which the opening 43 in each of the valve pistons 39 provides, the rate at which the fluid flows from the charged brake pipe when the valve pistons 39 are seated against the seat ribs 42 will be restrained an amount sufficient to prevent a rapid drop in the pressure in the charged brake pipe and therefore an emergency application of the brakes on the section of train having the charged brake pipe will not result. The section of train having the uncharged brake pipe will thus be supplied with fluid from the charged brake pipe at a reduced rate, so that pressure is gradually built up in the uncharged brake pipe.

When the cars are being coupled together, the lever 72 is released from the link of the chain 76 and then swung from the position shown by the broken lines in Fig. 4 to the full line or vertical position therein shown. This movement of the lever returns the cam 62 to the position shown in Fig. 1, and the pressure of the fluid in chamber 38 acts on the diaphragm 51 to force the same upwardly.

During this upward movement of the diaphragm, the fingers 49 will be moved longitudinally of the slots 48 until further movement of the cap 50 outwardly from the collar 47 is prevented by the fingers engaging the ends of the slots.

Continued movement of the diaphragm 51 will lift the valve piston 39 from the seat rib 42, thereby opening unrestricted communication through the brake pipe.

If the cars unintentionally separate, the actuator 63 will not be operated to depress the diaphragm 51, and consequently the valve piston 39 will remain in the position shown in Fig. 1. This is possible, because no restriction is provided from the brake pipe passage 35, outside of seat rib 42 and the conduit 36. Therefore, the pressure over the entire lower face of valve piston 39 will reduce at the same time. Openings 56 are of such flow area as to allow pressure from chamber 38 to reduce with the pressure on the lower face of the valve piston 39. The pressure on the valve piston thus remains equal and the pressure on the diaphragm 51 is therefore permitted to hold said valve piston in the fully opened position, thereby permitting an unrestricted flow of the brake pipe fluid through the open end of the conduit 36 when the coupling heads are pulled apart. In this way an emergency application of the brakes will be effected.

While one illustrative embodiment of the invention has been described in detail, it is not our intention to limit its scope to that embodiment or otherwise than by the terms of the appended claims.

Having now described our invention, what we claim as new and desire to secure by Letters Patent, is:—

1. A coupling having a conduit, valve means for controlling communication through the conduit, said valve means having a normally closed restricted opening therein, manually operated means for moving the valve means to closed position when the coupling is uncoupled from a counterpart coupling; and means mounted in the conduit in proximity to the valve means for opening the restricted opening in the valve means when the coupling is being connected to a counterpart coupling.

2. An automatic coupling having a conduit provided with a compound valve for controlling the amount of fluid passing therethrough, means for operating the valve to close the conduit when the coupling is uncoupled from a counterpart coupling, and means for successively unseating the component parts of the valve, said valve unseating means including a plunger mounted in the conduit and adapted to be moved toward the compound valve when the coupling is being coupled to a counterpart coupling.

3. An automatic coupling having a conduit provided with a compound valve for controlling the amount of fluid passing therethrough, and a plunger mounted in the conduit for unseating one of the component parts of the valve when the coupling is being coupled to a counterpart coupling so as to permit a restricted amount of fluid to pass by the valve, said plunger being mounted for movement independently of said valve.

4. An automatic coupling having a conduit provided with a compound valve for controlling the amount of fluid passing therethrough, means mounted in the conduit and actuated when the coupling is being coupled with a counterpart coupling for unseating one of the component parts of the valve to permit a restricted amount of fluid to pass by the valve, said means being mounted for movement independently of said valve, and means for subsequently unseating the other component part of the valve to permit an unrestricted amount of fluid to flow through the conduit.

5. The combination with a brake pipe, of a coupling head having a conduit in communication with the brake pipe, a main valve for controlling communication through the conduit, an auxiliary valve for controlling a restricted communication through the conduit when the main valve is seated, and means mounted in the conduit for opening said auxiliary valve upon the coming together of counterpart couplings, said means being mounted for movement independently of said auxiliary valve.

6. An automatic coupling having a conduit, a compound valve controlling the amount of fluid flowing through the conduit, said compound valve comprising a main valve for controlling communication through the conduit and an auxiliary valve mounted in the main valve and controlling a restricted communication therethrough, and means mounted in the conduit for unseating the auxiliary valve upon the coming together of counterpart couplings, said means being mounted for movement independently of said auxiliary valve.

7. A coupling head provided with a conduit, means for controlling communication through the conduit comprising a main valve and an auxiliary valve for controlling a restricted communication through the main valve, and means mounted in the conduit for unseating the auxiliary valve in advance of the actuation of the main valve, said means being mounted for movement independently of said auxiliary valve.

8. A coupling head provided with a conduit, a chamber communicating with the conduit, a main valve mounted in the chamber for the purpose of controlling communication through the conduit, an auxiliary valve carried by the main valve, said auxiliary valve being adapted to control a restricted communication through the conduit when the main valve is seated, means mounted in the conduit for actuating the auxiliary valve to establish communication through the conduit when the coupling head is coupled to a counterpart coupling head, and means for subsequently unseating the main valve after a predetermined amount of fluid has passed by the auxiliary valve.

In testimony whereof we have hereunto set our hands, this 8th day of December 1928.

THOMAS H. THOMAS.
UNCAS A. WHITAKER.